(12) United States Patent
Lansinger

(10) Patent No.: US 6,296,291 B1
(45) Date of Patent: Oct. 2, 2001

(54) REINFORCED VEHICLE SEAT BACK

(75) Inventor: Jere R. Lansinger, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/672,280

(22) Filed: Sep. 28, 2000

(51) Int. Cl.[7] ................................ B60N 2/02; B60N 2/42
(52) U.S. Cl. ................................ 296/65.16; 297/216.13
(58) Field of Search ............................. 296/68.1, 65.16; 297/215, 216.1, 216.13, 216.14

(56) References Cited

U.S. PATENT DOCUMENTS

| | | | |
|---|---|---|---|
| 4,003,534 | * 1/1977 | Kenigsberg et al. | 297/216 |
| 4,192,545 | * 3/1980 | Higuchi et al. | 297/216 |
| 4,249,769 | 2/1981 | Barecki . | |
| 4,474,347 | * 10/1984 | Hazelsky | 297/216 |
| 4,493,505 | 1/1985 | Yamawaki et al. . | |
| 4,824,175 | * 4/1989 | Tokugawa | 296/68.1 |
| 4,993,778 | 2/1991 | Colin et al. . | |
| 5,253,924 | * 10/1993 | Glance | 297/216.13 |
| 5,328,226 | * 7/1994 | Thomas | 296/68.1 |
| 5,401,072 | 3/1995 | Farrand . | |
| 5,439,272 | 8/1995 | Hallet et al. . | |
| 5,468,044 | * 11/1995 | Coman | 296/68.1 |
| 5,494,316 | * 2/1996 | Maesing et al. | 296/68.1 |
| 5,575,533 | 11/1996 | Glance . | |
| 5,641,198 | 6/1997 | Steffens, Jr. . | |
| 5,676,423 | 10/1997 | Pedronno et al. . | |
| 5,746,476 | 5/1998 | Novak et al. . | |
| 5,829,831 | 11/1998 | Sharman . | |
| 5,913,567 | 6/1999 | Novak et al. . | |
| 5,927,804 | * 7/1999 | Cuevas | 297/216.13 |
| 6,056,366 | 5/2000 | Haynes . | |
| 6,074,004 | * 6/2000 | Carmichael | 297/216.14 |
| 6,076,880 | * 6/2000 | Coffer et al. | 296/65.16 |
| 6,179,362 | * 1/2001 | Wisniewski et al. | 296/65.05 |
| 6,209,943 | * 4/2001 | Neale et al. | 296/65.16 |

* cited by examiner

Primary Examiner—D. Glenn Dayoan
Assistant Examiner—Hilary Gutman
(74) Attorney, Agent, or Firm—Mark P. Calcaterra

(57) ABSTRACT

A vehicle seat back panel can be reinforced against transverse buckling forces by training a high tensile strength web, or strip, back and forth along one face of the panel. The flexible strip is anchored to high strength brackets located along the margins of the panel, so that the strip absorbs most of the buckling loads imposed on the panel in pure tension.

8 Claims, 2 Drawing Sheets

REINFORCED VEHICLE SEAT BACK

FIELD OF THE INVENTION

This invention relates to vehicle seat constructions, and particularly to a reinforced vehicle seat back structure.

BACKGROUND OF THE INVENTION

In some automotive vehicles the rear seat includes a seat back structure that can be swingably adjusted between an upright position and a prone position. When the seat back is in the upright position the rear seat can be used for human seating purposes, in the usual fashion. When the seat back is in the prone position, the trunk (or cargo) space is in open communication with the rear seating area so that longer cargo items, e.g. skis, toboggans, etc. can be accommodated in the elongated storage space behind the vehicle front seat.

In such vehicles the seat back for the vehicle rear seat is constructed as a relatively light structure so that it can be moved easily between the normal upright position and the prone position. As a result, the seat back panel is susceptible to being damaged or fractured by cargo impaction forces when the seat back is in the upright position. The possibility of seat back panel damage occurs primarily when the vehicle comes to an abrupt stop in the forward direction, e.g. during panic braking or during a front end collision. Heavy cargo items in the trunk can be displaced forwardly so as to forcibly impact the rear seat back panel, thereby possibly fracturing the panel so as to potentially injure a person sitting on the rear seat.

The present invention relates to a low cost, light weight mechanism for reinforcing the panel of a vehicle seat back structure, particularly a panel that is otherwise relatively light and hence subject to buckling or fracture when impacted by moving cargo in the space behind the seat back.

SUMMARY OF THE PRESENT INVENTION

The invention contemplates a panel reinforcement mechanism that includes a high tensile strength strip or web anchored to edge areas of the panel so as to extend back and forth along the panel front surface. Should cargo behind the panel impart a shock force to the panel the web will stretch incrementally along its entire length, thereby absorbing the impact force and limiting any appreciable buckling or fragmentation of the panel.

The web (or strip) panel reinforcement mechanism is advantageous in that it adds relatively little to the overall weight of the panel. Also, the reinforcement mechanism is relatively inexpensive. The invention incorporates an advantageous reinforcing feature into an otherwise conventional seat back panel, without appreciably increasing the weight or cost of the panel.

Specific features of the invention will be apparent from the attached drawings and description of an illustrative embodiment of the invention.

DESCRIPTION OF A PREFERRED EMBODIMENT OF THE INVENTION

Figure 1:
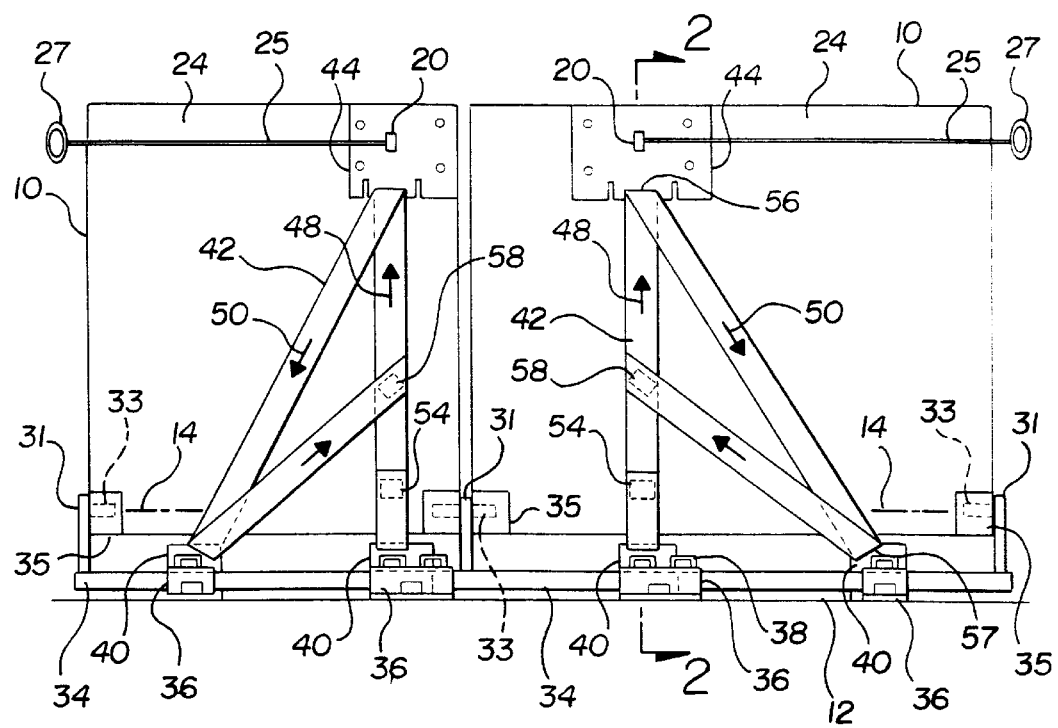
FIG. 1 is a front elevational view of two in-line vehicle seat back panels having a flexible strip-type reinforcement mechanism of the present invention.
Figure 2:
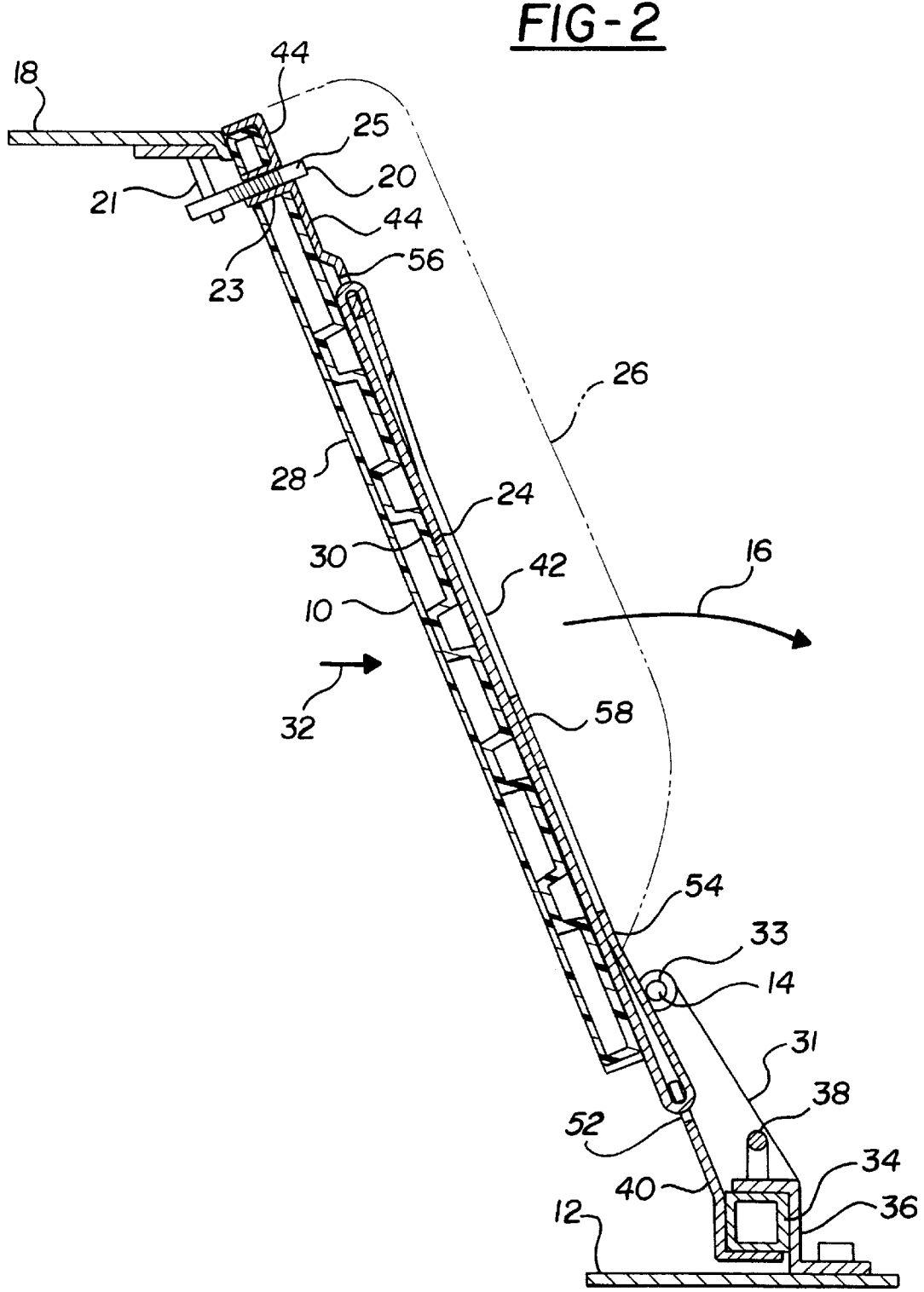
FIG. 2 is an enlarged transverse sectional view taken on line 2—2 in FIG. 1.

Referring particularly to FIG. 1, there are shown two individual upright panels 10 hingedly supported on a vehicle floor 12, so that either panel can be swung manually between an upright position and a prone position. As shown in FIG. 1, both panels are in the upright position. Each panel can be manually moved around a hinge axis 14, to take a prone position. FIG. 2 is a transverse sectional view taken through one of the panels to better illustrate the swinging motion of the panel around hinge axis 14. In FIG. 2, arrow 16 indicates the swinging motion of the panel from the normal upright position (as shown) toward the prone position.

As shown in FIG. 2, the upper edge area of panel 10 rests against the front edge of a shelf 18 that serves as partial support for the panel. A manual latch 20 is mounted on plate 44 for retentive engagement with a striker 21 carried by shelf 18, whereby panel 10 is releasably retained in the upright position. As illustratively shown, the latch is pivotably mounted on a pin 23 extending between two ears that extend rearwardly from plate 44; latch 20 can swing around the pin axis. The rear end of the latch has a hook configuration for partial encirclement of striker 21. The front end of latch 20 is attached to a cable 25 that extends horizontally long the front face of panel 10. An exposed handle 27 on the cable enables a person to exert a pulling force on the cable, thereby swinging the latch to a non-latching condition. A spring (not shown) returns the latch to the latching position. When latch 20 is in the open (nonlatching) position, panel 10 can be swung forwardly in the arrow 16 direction to a prone position.

The hinge structures at the lower ends of panels 10 can take various forms. As shown in FIG. 1, the hinge structures include three upstanding plate like struts 31 welded to a horizontal support rail 34. Hinge pins 33 extend laterally from struts 31 into sockets formed by brackets 35 that are secured to the front face of the associated panel 10. The panel can swing around a hinge axis 14 defined by hinge pins 33.

Front face 24 of the panel is covered by padding 26 so that the padded panel can serve as the back of a vehicle seat, not shown. The seating portion of the vehicle seat is located forwardly from panel 10, to the right of the panel in FIG. 2. The area behind panel 10, i.e. the area to the left of the panel in FIG. 2, is a cargo area, usually formed by the rear trunk of the vehicle.

When panel 10 is swung forwardly to the prone position, the vehicle cargo area is thereby lengthened to permit elongated cargo items to be placed in the cargo area, thereby enhancing the versatility of the vehicle. FIG. 2 shows panel 10 in its normal upright position, in which it forms the normal use seat structural component for the vehicle seat back. As depicted in FIG. 2, panel 10 is formed by two plastic panel elements 28 and 30 sandwiched together to form a hollow panel structure. Plastic element 30 is embossed at selected areas to enhance the structural rigidity of the panel. Panel 10 is nevertheless a relatively light thin gage structure, subject to buckling or fracture should the cargo forcibly impact the panel, as denoted by arrow 32 in FIG. 2. The present invention concerns a light weight, low cost, mechanism for reinforcing panel 10 against buckling or fragmentation as a result of impact force in the arrow 32 direction. The panel reinforcing mechanism includes a flexible web or strip 42 extending along the front face of panel 10 so that panel deformation in the forward (rightward) direction places the flexible strip in tension. The tensioned strip limits the panel deformation, thereby minimizing panel damage and potential injury to a person having his back resting against padding 26.

As shown in FIG. 1, there are two panels 10, each hingedly supported for swinging motion around hinge axis 14. The panels are of different size in the transverse (width) direction, but of generally similar construction. Each panel may be reinforced by a generally similar flexible strip mechanism embodying features of the invention.

The hinge support mechanism for panels 10 includes the horizontal rail 34 that is rigidly fastened to the vehicle floor by four brackets 36 spaced along the length of the rail. Each bracket mounts one or more U-shaped anchors 38 for conventional passenger seat belts, not shown. In FIG. 1 the four brackets 36 mount six anchors 38, sufficient for three seat belt sets.

In the present invention the areas of rail 34 that mount brackets 36 are used also for mounting four brackets 40. Each bracket 40 serves as a lower anchorage for a flexible strip 42 that spans the front face of a panel 10. In preferred practice of the invention, each panel 10 is reinforced by a single flexible strip 42 that extends along the front face of the panel between the lower strip anchorage brackets 40 and an upper strip anchorage metal plate 44 suitably secured to the panel front face proximate to the panel upper edge. As previously noted, each metal plate 44 also serves as a structural support for the aforementioned manual latch 20. Each flexible strip 42 can be formed of a high tensile strength flexible material, e.g. the woven plastic strand materials commonly used for vehicle seat belts, or alternatively, high tensile steel banding.

In FIG. 1, arrows are used to trace a path taken by flexible strip 42 as it transverses the front face of the associated panel 10. Each strip 42 extends from one of the lower brackets upwardly to upper anchorage plate 44, via a section 48, then diagonally downwardly to the other anchorage bracket 40, via a section 50, then diagonally back to a mid-point on section 48 of the strip. The panel reinforcing action is achieved by a single flexible strip 42.

FIG. 2 shows some features of a representative lower anchorage bracket 40 and upper anchorage plate 44. Lower anchorage bracket 40 includes a plate-like bracket having a slot 52 that receives a looped end portion of strip 42. The extreme end of the loop is secured to strip 42 by stitching 54 (FIG. 1).

Upper anchorage plate 44 includes a slot 56 formed in an outwardly embossed area of the metal plate, so that strip 42 can extend freely through the slot. The other lower anchorage bracket 40 has a similar slot 57 (FIG. 1) that permits free movement of the flexible strip through that slot. The other free end of strip 42 is stitched to section 48 of the strip, as at stitching 58. Stitchings 54 and 58 represent the respective ends of the flexible strip 42. With the illustrated construction essentially the entire length of the flexible strip can stretch (incrementally) in response to panel-buckling forces. The three strip anchorage points at brackets 40, 40 and at plate 44 are high strength areas in the system. Anchorage brackets 40, 40 are located on a rigid horizontal rail 34 that is securely fastened to the vehicle floor by brackets 36. Upper strip anchoring plate 44 is a relatively heavy metal plate having a substantial face area for distribution of any loads imposed by strip 42.

Figure 3:
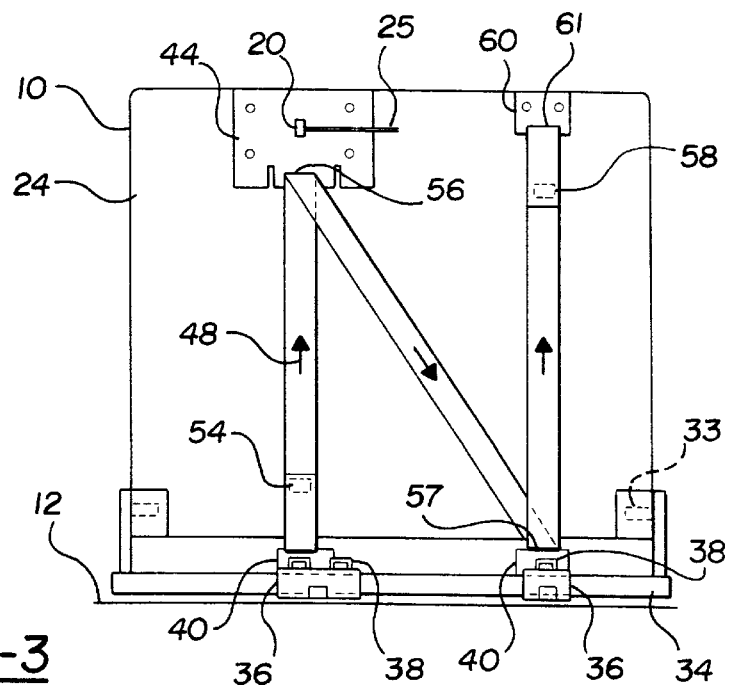
FIG. 3 is a fragmentary elevational view taken in the same direction as FIG. 1, but showing another strip-type reinforcement mechanism that can be used in practice of the invention.

FIG. 1 illustrates a preferred form of the invention. FIG. 3 illustrates another form that the invention can take. As shown in FIG. 3, there is a second upper strip anchoring means that takes the form of a metal plate 60 secured to the front face of panel 10. Flexible strip 42 extends upwardly from a lower anchorage bracket 40 through a slot 56 in upper plate 44, then diagonally downwardly through a slot 57 in the other anchorage bracket 40, then upwardly through a slot 61, in upper plate 60. The looped end of the strip is stitched to the strip by stitching 58.

The FIG. 1 arrangement is somewhat simpler that the FIG. 3 arrangement, and is therefore the preferred arrangement. In both arrangements, the flexible strip spans the central face area of the panel so as to provide a relatively good reinforcement action against panel-buckling forces.

What is claimed:

1. An automotive vehicle having a floor and a rear seat mounted on said floor, the combination comprising:

a normally upright back structure for said rear seat:

said back structure comprising a panel, and support means hingedly connecting said panel to the vehicle floor, whereby said panel is swingable between an upright position and a prone position; said panel having an upper edge and a lower edge; and means for reinforcing said panel against buckling in a forward direction; said reinforcing means comprising a flexible strip means, a first strip anchoring means on said panel approximate to the panel upper edge, and a second strip anchoring means carried by said panel support means below the panel lower edge;

said flexible strip means extending along one face of said panel between said first and second anchoring means to resist panel-buckling forces in the forward direction.

2. The combination of claim 1, wherein said panel support means comprises a horizontal rail extending along the vehicle floor below the panel lower edge; said second strip anchoring means comprises a plurality of strip anchorage brackets secured to said rail at spaced points therealong.

3. The combination of claim 2, wherein said first strip anchoring means comprises a single strip anchorage plate secured to said panel proximate to the panel upper edge.

4. The combination of claim 3, wherein said flexible strip means extends from one of said strip anchorage brackets upwardly to said strip anchorage plate and then diagonally downwardly to another of said strip anchorage brackets.

5. The combination of claim 4, wherein said strip anchorage plate has a strip-accommodation slot therein; said strip means extending freely through said slot, whereby said strip means is slidably connected to said anchorage plate.

6. The combination of claim 1, wherein said strip means is located on a front face of said panel.

7. The combination of claim 1, wherein said strip means is movably related to said one face of the panel, whereby essentially the entire length of the strip means can stretch in response to panel-buckling forces.

8. The combination of claim 1, wherein said second strip anchoring means comprises two strip anchorage brackets located below the panel lower edge at spaced points therealong; said first strip anchoring means comprising a strip anchorage plate secured to said panel proximate to the panel upper edge; said strip anchorage plate having a strip-accommodation slot spaced from said one panel face; said strip means comprising a single flexible strip extending from one of said strip anchorage brackets upwardly through said strip-accommodation slot and then diagonally downward to the other strip anchorage bracket; said single flexible strip being slidably related to the slot in the strip anchorage plate, whereby essentially the entire length of said single flexible strip can stretch in response to panel-buckling forces.

* * * * *